(12) United States Patent
Kosolobov (10) Patent No.: US 8,805,401 B2
(45) Date of Patent: Aug. 12, 2014

(54) METHOD AND SYSTEM FOR INTELLIGENT SWITCH BETWEEN CLIENT BASED LOCATION AND SERVER BASED LOCATION FOR HYBRID LOCATION CLIENT DEVICES

(75) Inventor: Andrei Kosolobov, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 532 days.

(21) Appl. No.: 13/045,731

(22) Filed: Mar. 11, 2011

(65) Prior Publication Data

US 2012/0184288 A1    Jul. 19, 2012

Related U.S. Application Data

(60) Provisional application No. 61/434,046, filed on Jan. 19, 2011.

(51) Int. Cl.
*H04W 24/00* (2009.01)

(52) U.S. Cl.
USPC ............. 455/456.1; 455/456.6; 370/338

(58) Field of Classification Search
USPC ............. 455/403, 404.1, 404.2, 422.1, 455/456.1–456.6; 370/338
See application file for complete search history.

(56) References Cited

U.S. PATENT DOCUMENTS

| | | | |
|---|---|---|---|
| 2010/0238069 A9 | 9/2010 | Rotman et al. | |
| 2011/0057835 A1* | 3/2011 | Yeshayahu | 342/357.31 |
| 2011/0105149 A1* | 5/2011 | Riley et al. | 455/456.1 |
| 2011/0128184 A1* | 6/2011 | Boiero et al. | 342/357.31 |
| 2011/0201357 A1 | 8/2011 | Garrett et al. | |
| 2011/0307173 A1* | 12/2011 | Riley | 701/220 |
| 2012/0015670 A1* | 1/2012 | Boyer et al. | 455/456.1 |
| 2012/0083285 A1* | 4/2012 | Shatsky et al. | 455/456.1 |
| 2012/0086552 A1* | 4/2012 | Fast et al. | 340/8.1 |
| 2012/0165037 A1* | 6/2012 | Bull et al. | 455/456.1 |
| 2012/0169533 A1* | 7/2012 | Harper et al. | 342/357.29 |
| 2012/0208515 A1* | 8/2012 | Alfano et al. | 455/418 |

* cited by examiner

*Primary Examiner* — Ajit Patel
(74) *Attorney, Agent, or Firm* — Sterne, Kessler, Goldstein & Fox P.L.L.C.

(57) ABSTRACT

A client device dynamically selects one of client based location computation and server based location computation, based on propagation environment around the client device, to determine its own location. The client device may switch between client based location computation and server based location computation based on the local propagation environment for a desired quality of location and low data load from a remote location server. The client device measures power of received radio transmissions from radio transmission sources such as WLAN access points and/or cellular base stations. For a client based location solution, the client device performs location computation utilizing the local power measurement and assistance data downloaded from the remote location server. For a server based location solution, the remote location server may perform location computation for the client device. The client device determines the corresponding server based location solution by decoding information received from the remote location server.

20 Claims, 4 Drawing Sheets

METHOD AND SYSTEM FOR INTELLIGENT SWITCH BETWEEN CLIENT BASED LOCATION AND SERVER BASED LOCATION FOR HYBRID LOCATION CLIENT DEVICES

CROSS-REFERENCE TO RELATED APPLICATIONS/INCORPORATION BY REFERENCE

This patent application makes reference to, claims priority to, and claims benefit from U.S. Provisional Application Ser. No. 61/434,046, which was filed on Jan. 19, 2011.

This application also makes reference to U.S. application Ser. No. 12/757,682, which was filed on Apr. 9, 2010.

Each of the above reference applications is hereby incorporated herein by reference in its entirety.

FIELD OF THE INVENTION

Certain embodiments of the invention relate to communication systems. More specifically, certain embodiments of the invention relate to a method and system for intelligent switch between client based location computation and server based location computation for hybrid location client devices.

BACKGROUND OF THE INVENTION

Location-based services are emerging as a new type of value-added service provided by mobile communication network. Location-based services are mobile services in which the user location information is used in order to enable various location-based applications such as, for example, enhanced 911 (E-911), location-based 411, location-based messaging and/or location-based friend finding services.

A location of a mobile device may be determined in different ways such as, for example, using network-based technology, using terminal-based technology, and/or hybrid technology (a combination of the former technologies). Many positioning technologies such as, for example, Time of Arrival (TOA), Observed Time Difference of Arrival (OT-DOA), Enhanced Observed Time Difference (E-OTD) as well as the Global navigation satellite-based systems (GNSS) such as GPS, GLONASS, Galileo, and/or Assisted-GNSS (A-GNSS), are in place to estimate the location (latitude and longitude) of the mobile device and convert it into a meaningful X, Y coordinate for LBS applications. A-GNSS technology combines satellite positioning and communication networks such as mobile networks to reach performance levels allowing the wide deployment of Location-Based Services.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for intelligent switch between client based location computation and server based location computation for hybrid location client devices, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for intelligent switch between client based location computation and server based location computation for hybrid location client devices. In various embodiments of the invention, a wireless communication device such as a client device may be operable to dynamically select one of client based location computation and server based location computation based on propagation environment around the client device. The propagation environment around the client device may comprise propagation related information such as the moving speed and the distribution density of deployed radio resources utilized for location computation for the client device. The location of the client device may be determined utilizing the selected one of client based location computation and server based location computation. In addition, the client device may switch between client based location computation and server based location computation based on the local propagation environment to maintain a desired quality of location while reducing data load from a remote location server. The client device may measure power of radio transmissions received from various radio transmission sources such as WLAN access points and/or cellular base stations. For a client based location solution, the client device may download assistance data from the remote location server for location information related to the radio transmission resources. The client device may perform location computation utilizing the local power measurement and the downloaded assistance data. For a server based location solution, the remote location server may perform location computation for the client device utilizing information such as power measurement and/or propagation environment information collected from a plurality of associated client devices. The remote location server may provide the resulting server based location solution to the client device via an appropriate communication network. The client device may determine its location by decoding information received from the remote location server.

Figure 1:
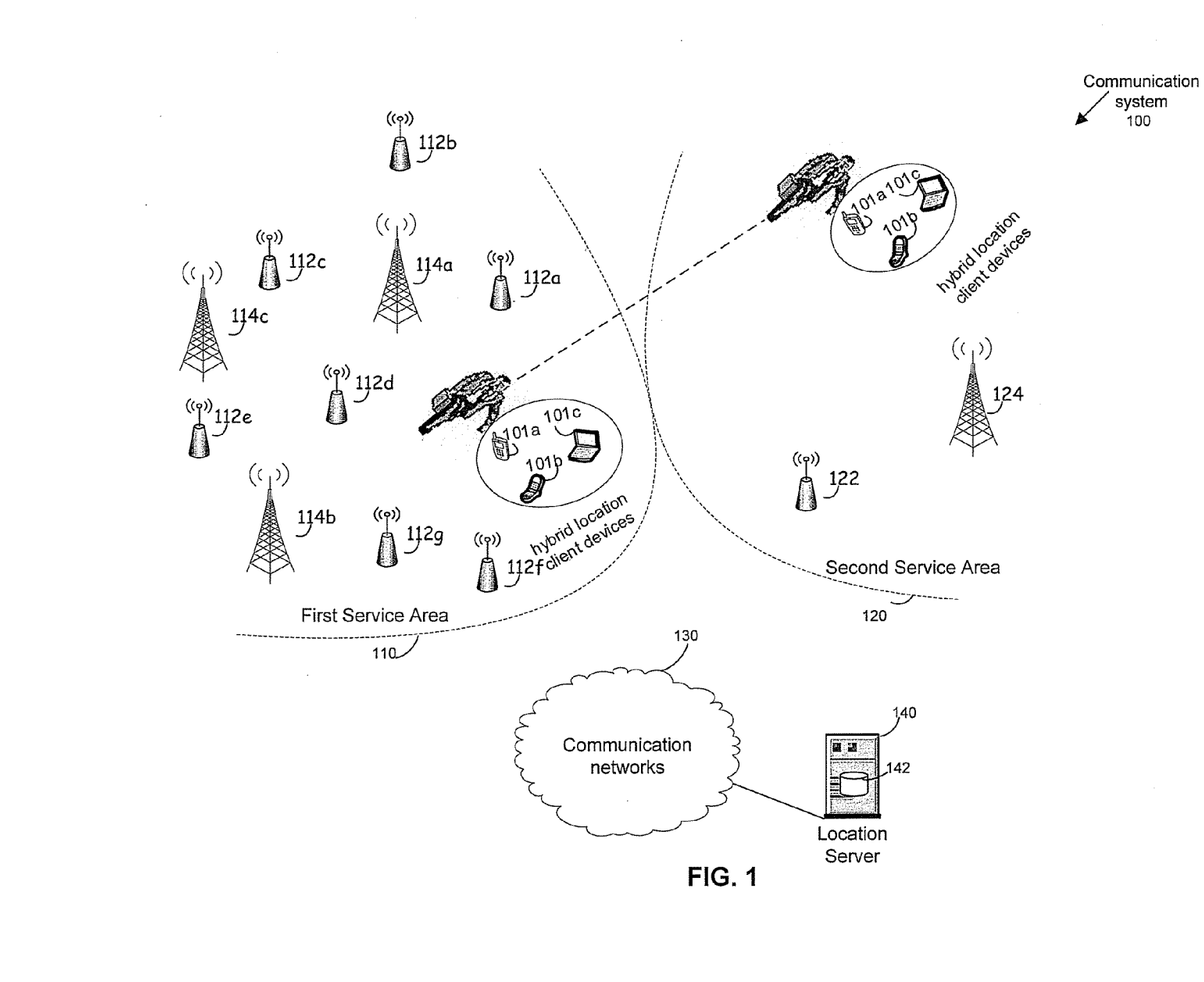
FIG. 1 is a diagram illustrating an exemplary communication system that is operable to support intelligent switching between client based location computation and server based location computation for hybrid location client devices, in accordance with an embodiment of the invention.

FIG. 1 is a diagram illustrating an exemplary communication system that is operable to support intelligent switching between client based location computation and server based location computation for hybrid location client devices, in accordance with an embodiment of the invention. Referring to FIG. 1, there is shown a communication system 100. The communication system 100 comprises a first service area 110, a second service area 120, a plurality of hybrid location client devices 101a-101c, a plurality of wireless access points 112a-112g, 122, a plurality of base stations 114a-114c, 124, communication networks 130, and a location server 140. The wireless access points 112a-112g, and the base stations 114a-114c are deployed or located within the first service area 110. The wireless access point 122 and the base station 124 are deployed or located within the second service area 120. The location server 140 is communicatively coupled with a reference database 142.

The first service area 110 may comprise geographical areas covered or served by the wireless access points 112a-112g and the base stations 114a-114c. The second service area 120 may comprise geographical areas covered or served by the wireless access point 122 and the base station 124. The wireless access points 112a-112g, 122, and the base stations 114a-114c, 124 may serve as radio transmission resources and radio receiving resources for communicating radio signals with associated devices. For example, the wireless access points 112a-112g and the base stations 114a-114c may serve as radio transmission resources for transmitting radio signals to devices within the first service area 110. The wireless access point 122 and the base station 124 may serve as radio transmission resources for transmitting radio signals to devices within the second service area 120. The distribution density of radio transmission resources deployed within the first service area 110 may be higher than the distribution density of radio transmission resources deployed within the second service area 120.

A wireless access point such as the wireless access point 122 may comprise suitable logic, circuitry, interfaces and/or code that are operable to connect wireless communication devices to a wireless or wired network using Wi-Fi, or related standards. The wireless access point 122 may operate or function as a central transmitter and receiver of a wireless local network (WLAN). The wireless access point 122 may be operable to provide data services such as LBS applications to wireless LAN enabled communication devices such as, for example, the hybrid location client devices 101a-101c, using wireless LAN technology. Exemplary wireless LAN technology may comprise, for example, IEEE Std 802.11, 802.11a, 802.11b, 802.11d, 802.11e, 802.11g, 802.11n, 802.11v, and/or 802.11u. The location related information such as the location and the WLAN ID for the wireless access point 122 may be utilized to compute location for the hybrid location client devices 101a-101c. The location related information for the wireless access point 122 may be stored and tracked in the reference database 142 via the location server 140.

A base station such as the base station 114a may comprise suitable logic, circuitry, interfaces and/or code that are operable to manage and schedule communication resources such as time slots and/or frequency bands in an uplink direction and/or downlink direction within the first service area 110. The base station 114a may be operable to receive and/or transmit radio frequency signals from and/or to associated devices such as the hybrid location client devices 101a-101c using various air interface protocols specified in, for example, WLAN, CDMA, GSM, UMTS, LTE, BLUETOOTH, and/or WiMAX radio access networks. The base station 114a may be operable to deliver and/or communicate services such as, for example, LBS applications, provided through the communication networks 130 to intended devices such as the hybrid location client devices 101a-101c. In this regard, the location related information for the base station 114a such as, for example, location, CellID, Country Code (MCC) and/or Mobile Network Code (MNC) associated with the base station 114a, may be utilized to compute location for the hybrid location client devices 101a-101c. The location related information for the base station 114a may be stored and tracked in the reference database 142 via the location server 140.

A client device such as the hybrid location client device 101a may comprise suitable logic, circuitry, interfaces and/or code that are operable to communicate and share information with the associated location server 140. The hybrid location client device 101a may be allowed by the location server 140 to access and utilize information such as location related information stored in the reference database 142. The hybrid location client device 101a may be operable to receive hybrid radio transmissions from various radio transmission resources such as, for example, the wireless access points 112a-112g and/or the base stations 114a-114c. Depending on device capabilities and/or user preferences, the hybrid location client device 101a may utilize hybrid radios such as a combination of WLAN radio, BLUETOOTH radio, CDMA radio and WiMAX radio to receive corresponding radio transmissions. The hybrid location client device 101a may measure power of the received hybrid radio transmissions from the wireless access points 112a-112g and/or the base stations 114a-114c. The power measurements may be utilized to compute the location for the hybrid location client device 101a. The location for the hybrid location client device 101a may be determined or calculated utilizing client based location computation or server based location computation.

For a client based location solution, the hybrid location client device 101a may be operable to download, from the location server 140, necessary information (assistance data) indicating location related information for the radio transmission resources such as the wireless access points 112a-112g and/or the base stations 114a-114c that are utilized for location computation. The hybrid location client device 101a may compute its own location utilizing the downloaded assistance data together with the local power measurements.

For a server based location solution, the hybrid location client device 101a may communicate the local power measurements and associated location related information such as, for example, WLAN ID and CellID, to the location server 140 via the communication networks 130. The location computation for the hybrid location client device 101a may be performed by the location server 140 utilizing information received from the hybrid location client device 101a and information collected from a plurality of other client devices associated with the location server 140. The computed location for the hybrid location client device 101a may be delivered or communicated to the hybrid location client device 101a from the location server via the appropriate communication networks 130. In other words, the hybrid location client device 101a may determine its own location from information received from the location server 140.

In various exemplary embodiments of the invention, the hybrid location client device 101a may be operable to dynamically select one of client based location computation and server based location computation based on propagation environment around hybrid location client device 101a. More specifically, the hybrid location client device 101a may intelligently switch between client based location computation and server based location computation to fulfill a desired location quality without requiring large amount of data downloading from the location server 140. The hybrid location client device 101a may determine when to switch between client based location computation and server based location computation based on the current location or area of the hybrid location client device 101*a* and the propagation environment around the hybrid location client device 101*a*. The propagation environment around the hybrid location client device 101*a* refers to, for example, moving speed of the hybrid location client device 101*a*, moving direction of the hybrid location client device 101*a*, signal attenuation or interference levels, associated geographic area types such as indoor area, outdoor area, urban area and suburban area, physical obstacles or obstructions such as a wall and a building, and/or relative or actual distance between the hybrid location client device 101*a* and neighbor physical obstacles or obstructions. The propagation environment around the hybrid location client device 101*a* varies in terms of time and the location of the hybrid location client device 101*a*. The propagation environment around the hybrid location client device 101*a* may cause the wave propagation phenomena such as reflections and diffractions around the hybrid location client device 101*a*. In this regard, the propagation environment around the hybrid location client device 101*a* may change the characteristics of radio transmissions received from radio transmission resources such as, for example, the wireless access points 112*a*-112*g* and/or the base stations 114*a*-114*c*. For example, the hybrid location client device 101*a* at a high moving speed may experience signal fading on the received radio transmissions. Fast signal fading may require short packet transmission duration (high data rates) in order to maintain an appropriate service. In another example, high distribution density of radio transmission sources deployed around the hybrid location client device 101*a* may cause a high signal interference level and attenuate radio transmissions received from the radio corresponding transmission sources such as the wireless access points 112*a*-112*g* and/or the base stations 114*a*-114*c*.

In an exemplary embodiment of the invention, the hybrid location client device 101*a* may evaluate or track its actual moving speed. The hybrid location client device 101*a* may dynamically select one of client based location computation and server based location computation based on to its actual moving speed. Furthermore, the hybrid location client device 101*a* may intelligently switch between client based location computation and server based location computation according to its actual moving speed. For example, the hybrid location client device 101*a* may determine or set a speed threshold value according to QoS requirements such as delay, and/or device processing capabilities such as processing speed and available memory size. In instances where the hybrid location client device 101*a* starts at a moving speed that is higher than the speed threshold value, the hybrid location client device 101*a* may select server based location computation to ensure a desired location quality for the hybrid location client device 101*a*. In instances where the actual moving speed of the hybrid location client device 101*a* becomes lower than the speed threshold value, the hybrid location client device 101*a* may switch from server based location computation to client based location computation to reduce data load from the location server 140 while maintaining the desired quality of the location for the hybrid location client device 101*a*.

In an exemplary embodiment of the invention, the hybrid location client device 101*a* may monitor distribution density of the radio transmission sources deployed in the vicinity of the hybrid location client device 101*a*. The hybrid location client device 101*a* may determine the local distribution density information of the radio transmission sources utilizing various ways such as, for example, through a map for the geographic area around the hybrid location client device 101*a*. The hybrid location client device 101*a* may determine or set, based on QoS requirements such as error, rate, and/or device processing capabilities such as processing speed and available memory size, a distribution density threshold value for the radio transmission sources that may be used by the hybrid location client device 101*a* for location computation. In instances where the distribution density of the radio transmission sources around the hybrid location client device 101*a* is higher than the distribution density threshold value, the hybrid location client device 101*a* may select server based location computation to maintain a desired location quality for the hybrid location client device 101*a*. In instances where the distribution density of the radio transmission sources around the hybrid location client device 101*a* becomes lower than the distribution density threshold value, the hybrid location client device 101*a* may switch from server based location computation to client based location computation to reduce data load from the location server 140 while maintaining the desired quality of the location for the hybrid location client device 101*a*.

The communication networks 130 may comprise suitable logic, circuitry, interfaces and/or code that are operable to interface various radio transmission resources such as, for example, the wireless access points 112*a*-112*g*, 122, and/or the base stations 114*a*-114*c*, 124 using communication technologies such as WiFi, 3G, BLUETOOTH, and WiMAX. The communication networks 130 may be operable to communicate services such as location-based services to user terminals or devices such as, for example, the hybrid location client devices 101*a*-101*c*. The communication networks 130 may also be operable to communicate with the location server 140 for the location of the hybrid location client devices 101*a*-101*c* to support corresponding location-based services.

The location server 140 may comprise suitable logic, circuitry, interfaces and/or code that are operable to collect and/or retrieve location related information from associated users or devices such as the wireless access points 112*a*-112*g*, 122, the base stations 114*a*-114*c*, 124, and the hybrid location client devices 101*a*-101*c*. The retrieved location related information may comprise location, access point ID, base station ID, CellID, power measurements, and/or local propagation environment. The location server 140 may store the collected location related information in the reference database 142 to be shared with associated client devices such as the hybrid location client device 101*a* whenever need. In this regard, the location server 140 may communicate the stored location related information in the database 142 in the form of as assistance data to the hybrid location client device 101*a* via the communication networks 130. The location server 140 may also be operable to utilize the database 142 to compute location for client devices for a server based location solution.

In an exemplary operation, a device such as the hybrid location client device 101*a* may be operable to receive radio transmissions from various radio transmission resources such as, for example, the wireless access points 112*a*-112*g*, 122, the base stations 114*a*-114*c*, 124. The received radio transmissions may be utilized for location computation. In various exemplary embodiments of the invention, the hybrid location client device 101*a* may be operable to monitor or track the propagation environment around the hybrid location client device 101*a*. The hybrid location client device 101*a* may dynamically select one of client based location computation and server based location computation based on the local propagation environment to ensure a desired location quality. In this regard, the hybrid location client device 101*a* may intelligently switch between client based location computation and server based location computation based on the local propagation environment. For example, the hybrid location client device 101a may track its actual moving speed to dynamically select or switch between client based location computation and server based location computation. In another example, the hybrid location client device 101a may evaluate the distribution density of the surrounding radio transmission sources. The hybrid location client device 101a may dynamically select or switch between client based location computation and server based location computation according to the distribution density of the radio transmission sources around the hybrid location client device 101a. In low distribution density areas such as the second service area 120, the assistance data downloaded from the location server 140 may provide a wider coverage. However, in high distribution density areas such as the first service area 110, the assistance data downloaded from the location server 140 may provide a narrower coverage. In this regard, the hybrid location client device 101a in low distribution density areas such as the second service area 120 may select client based location computation. The hybrid location client device 101a in the second service area 120 may perform location computation with a desired quality of location while reducing data load from the location server 140. In instances where the hybrid location client device 101a moves from the second service area 120 to high distribution density areas such as the first service area 110, the hybrid location client device 101a may switch to server based location computation from client based location computation so as to ensure a desired location quality for the hybrid location client device 101a without increasing data load from the location server 140. In this regard, the hybrid location client device 101a in the first service area 110 may rely on the location server 140 to perform location computation. The hybrid location client device 101a in the first service area 110 may receive the computed location from the location server 140 via the communication networks 130.

Figure 2:
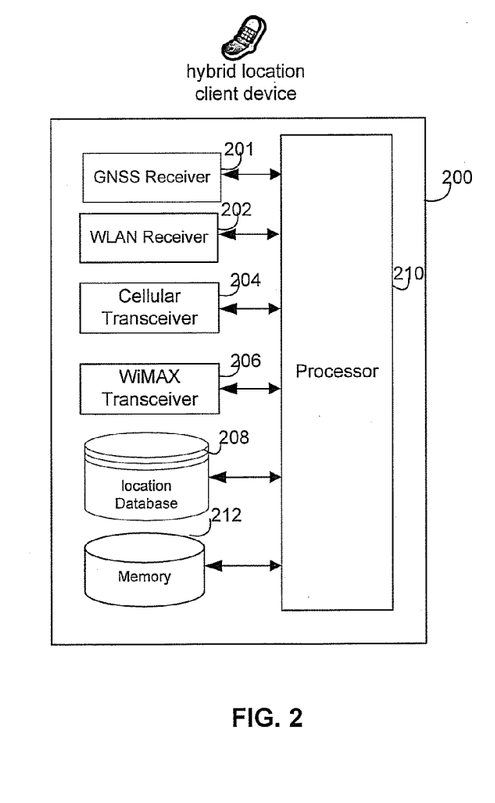
FIG. 2 is a block diagram illustrating an exemplary hybrid location client device that is operable to dynamically select one of client based location computation and server based location computation based on local propagation environment, in accordance with an embodiment of the invention.

FIG. 2 is a block diagram illustrating an exemplary hybrid location client device that is operable to dynamically select one of client based location computation and server based location computation based on local propagation environment, in accordance with an embodiment of the invention. Referring to FIG. 2, there is shown a hybrid location client device 200. The hybrid location client device 200 comprises a GNSS receiver 201, a WLAN receiver 202, a cellular transceiver 204, a WiMAX transceiver 206, a location database 208, a processor 210 and a memory 212.

The GNSS receiver 201 may comprise suitable logic, circuitry, interfaces and/or code that may be operable to detect and receive GNSS signals from a plurality of visible GNSS satellites. The GNSS receiver 201 may be operable to utilize the received GNSS signals to calculate navigation information such as a GNSS position and/or a velocity of the GNSS receiver 201. The calculated GNSS position of the GNSS receiver 201 may be provided to the processor 210 for various applications such as, for example, location based applications for the hybrid location client device 200.

The WLAN receiver 202 may comprise suitable logic, circuitry, interfaces and/or code that may be operable to receive and/or transmit radio frequency signals using wireless LAN technology. The WLAN receiver 202 may be operable to transmit and/or receive radio frequency (RF) signals over WLAN connections between the hybrid location client device 200 and a WLAN access point such as the wireless access point 112a. In this regard, RF signals received over the WLAN receiver 202 may be communicated to the processor 210 to determine or measure signal strength of the received WLAN radio transmissions from the wireless access point 112a.

The cellular transceiver 204 may comprise suitable logic, circuitry, interfaces and/or code that may be operable to receive and/or transmit radio frequency signals using various cellular communication technologies such as, for example, CDMA, GSM, UMTS and/or LTE. In this regard, RF signals received over the cellular transceiver 204 may be communicated to the processor 210 to determine or measure signal strength of the received cellular radio transmissions from the base station 114b, for example.

The WiMAX transceiver 206 may comprise suitable logic, circuitry, interfaces and/or code that may be operable to receive and/or transmit radio frequency signals using WiMAX technology. In this regard, RF signals received over the WiMAX transceiver 206 may be communicated to the processor 210 to determine or measure signal strength of the received WiMAX radio transmissions from a WiMAX base station such as the base station 114a, for example.

The location database 208 may comprise suitable logic, circuitry, interfaces and/or code that may be operable to manage and store data related to local and associated propagation information. The stored data may comprise, for example, signal strength measurements for received radio transmissions. The stored data may also comprise the location for the hybrid location client device 200 and the propagation environment around the hybrid location client device 200. At least a portion of the location database 208 may be communicated to the location server 140 to build and/or refine the reference database 142. The location database 208 may be updated or refined whenever changes in the location and/or the propagation environment around the hybrid location client device 200 occur.

The processor 210 may comprise suitable logic, circuitry, interfaces and/or code that may be operable to manage and/or control operations of associated device component units such as, for example, the GNSS receiver 201, the cellular transceiver 204, and/or the location database 208, depending on usages. For example, the processor 210 may be operable to activate or deactivate one or more associated radios such as the GNSS receiver 201 as a needed basis to save power. The processor 210 may be operable to coordinate operations among associated device component units for particular applications. The processor 210 may be operable to determine power on radio transmissions received via the WLAN receiver 202 and the cellular transceiver 204, for example. The processor 210 may be operable to track or collect information about the propagation environment around the hybrid location client device 200. The collected propagation environment information may be stored in the location database 208.

In an exemplary embodiment of the invention, the processor 210 may be operable to communicate the content such as power measurements and the propagation environment stored in the location database 208 with the location server 140 so as to build up the reference database 142. Depending on system configuration, the processor 210 may be operable to acquire assistance data from the location server 140 to support client based location computation, or may receive a server based location solution for the hybrid location client device 200 from the location server 140.

In an exemplary embodiment of the invention, the processor 210 may be operable to determine the actual moving speed of the hybrid location client device 200. The processor 210 may dynamically select one of client based location computation and server based location computation based on the moving speed of the hybrid location client device 200. In addition, the processor 210 may be operable to intelligently switch between client based location computation and server based location computation based on the moving speed of the hybrid location client device 200. For example, in instances where the hybrid location client device 200 starts moving slowly, data downloaded from the location server 140 may cover a wider coverage. In this regard, the processor 210 may select client based location computation for a desired location quality without increasing data load from the location server 140. In instances where the hybrid location client device 200 becomes moving faster, the data downloaded from the location server 140 may provide a more restricted cover. In this regard, the processor 210 may switch from client based location computation to server based location computation to ensure a desired location quality. In instances where the hybrid location client device 200 slows down again, the processor 210 may switch back to client based location computation from server based location computation to reduce data load from the location server 140, and the process may be repeated.

In an exemplary embodiment of the invention, the processor 210 may evaluate distribution density of the radio transmission sources that the hybrid location client device 200 may utilize for location computation. In this regard, the processor 210 may dynamically select one of client based location computation and server based location computation based on the distribution density of the radio transmission sources around the hybrid location client device 200. In addition, the processor 210 may be operable to intelligently switch between client based location computation and server based location computation based on the distribution density of the radio transmission sources around the hybrid location client device 200. For example, in instances where the hybrid location client device 200 is in a low distribution density area such as the first service area 120, data downloaded from the location server 140 may provide a wider coverage. In this regard, the processor 210 may select client based location computation to reduce data load from the location server 140 while maintaining a desired location quality. In instances where the hybrid location client device 200 leaves the second service area 120 and moves to a high distribution density area such as the first service area 110, the data downloaded from the location server 140 may cover a restricted area. In this regard, the processor 210 may switch to server based location computation from client based location computation to ensure a desired location quality without increasing data load from the location server 140. In instances where the hybrid location client device 200 returns back to a low distribution density area such as the second service area 120, then, the processor 210 may switch back to client based location computation from server based location computation to reduce data load from the location server 140, and the process may be repeated.

The memory 212 may comprise suitable logic, circuitry, interfaces and/or code that may be operable to store information such as executable instructions and data that may be utilized by the processor 210 and/or other associated component units such as, for example, the GNSS receiver 201 and/or the location database 208. The memory 212 may comprise RAM, ROM, low latency nonvolatile memory such as flash memory and/or other suitable electronic data storage.

In an exemplary operation, the hybrid location client device 200 may be operable to receive radio transmissions from various radio transmission resources such as, for example, the wireless access points 112a-112g, 122, the base stations 114a-114c, 124. The processor 210 may be operable to determine or measure the power on the received radio transmissions. The resulting power measurements may be stored in the location database 208. In various exemplary embodiments of the invention, the processor 210 may track the propagation environment around the hybrid location client device 200 and may store the propagation environment in the location database 208. The processor 210 may communicate the stored power measurement and/or the propagation environment information to the location server 140 to build up the reference database 142. In various exemplary embodiments of the invention, the processor 210 may be operable to intelligently switch or select between client based location computation and server based location computation for a desired location quality according to the location of the hybrid location client device 200 and the associated propagation environment. For example, the processor 210 may select or utilize client based location computation for the hybrid location client device 200 at a low speed. The processor 210 may switch to server based location computation from client based location computation whenever the hybrid location client device 200 moves at a high speed. In various exemplary embodiments of the invention, the processor 210 may evaluate the distribution density of the surrounding radio transmission sources so as to dynamically switch between client based location computation and server based location computation. For example, the processor 210 may utilize client based location computation when the hybrid location client device 200 is in a low distribution density area such as the second service area 120. The processor 210 may switch to server based location computation from client based location computation whenever the hybrid location client device 200a moves to a high distribution density area such as the first service area 110.

Figure 3:
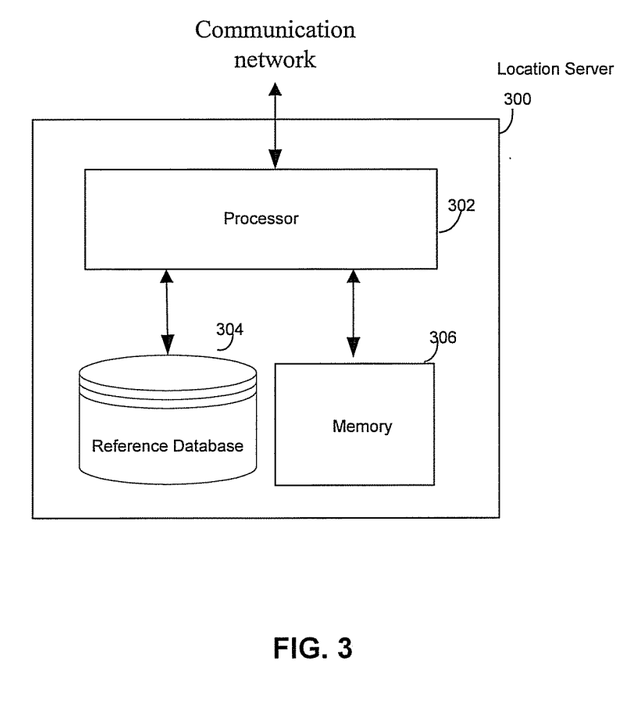
FIG. 3 is a block diagram illustrating an exemplary location server that is operable to perform server based location computation for hybrid location client device, in accordance with an embodiment of the invention.

FIG. 3 is a block diagram illustrating an exemplary location server that is operable to perform server based location computation for hybrid location client device, in accordance with an embodiment of the invention. Referring to FIG. 3, there is shown a location server 300. The location server 300 may comprise a processor 302, a reference database 304 and a memory 306.

The processor 302 may comprise suitable logic, circuitry, interfaces and/or code that may be operable to manage and/or control operations of the reference database 304 and the memory 306. The processor 302 may be operable to collect GNSS satellite data by tracking GNSS constellations. The processor 302 may be operable to utilize the collected GNSS satellite data to build the reference database 304, which may be coupled internally or externally to the location server 300. The processor 302 may also be operable to receive or collect location related information of users such as the wireless access points 112a-112g, 122, the base stations 114a-114c, 124, and the hybrid location client devices 101a-101c. The collected location related information of the hybrid location client devices 101a-101c may comprise location and associated propagation information such as moving speed of the corresponding hybrid location client devices 101a-101c, and distribution density of the surrounding radio transmission resources. The processor 302 may store the collected location related information in the reference database 304. In this regard, the processor 302 may share the data in the reference database 302 with associated users for client based location computation. The processor 302 may also be operable to utilize the reference database 304 to compute the location for associated users such as, for example, the hybrid location client device 101a, when needed. The processor 302 may provide the computed location to the hybrid location client device 101a via the communication networks 130.

The reference database 304 may comprise suitable logic, circuitry, interfaces and/or code that may be operable to store location related information and corresponding propagation environment of associated users such as, for example, such as the wireless access points 112a-112g, 122, the base stations 114a-114c, 124. The reference database 304 may be updated or propagated as a needed basis, aperiodically, or periodically.

The memory 306 may comprise suitable logic, circuitry, interfaces and/or code that may be operable to store information such as executable instructions and data that may be utilized by the processor 302 and/or other associated component units such as, for example, the reference database 304. The memory 306 may comprise RAM, ROM, low latency nonvolatile memory such as flash memory and/or other suitable electronic data storage.

In an exemplary operation, the processor 302 may be operable to collect location related information to build the reference database 304. Location related information of users such as the wireless access points 112a-112g, 122, the base stations 114a-114c, 124 may be tracked and stored in the reference database 304 to support location-based applications. In this regard, processor 302 may share at least a portion of the reference database 304 with associated users to support client based location computation. The processor 302 may also be operable to compute the location for associated users to provide corresponding server based location solutions to the users.

Figure 4:
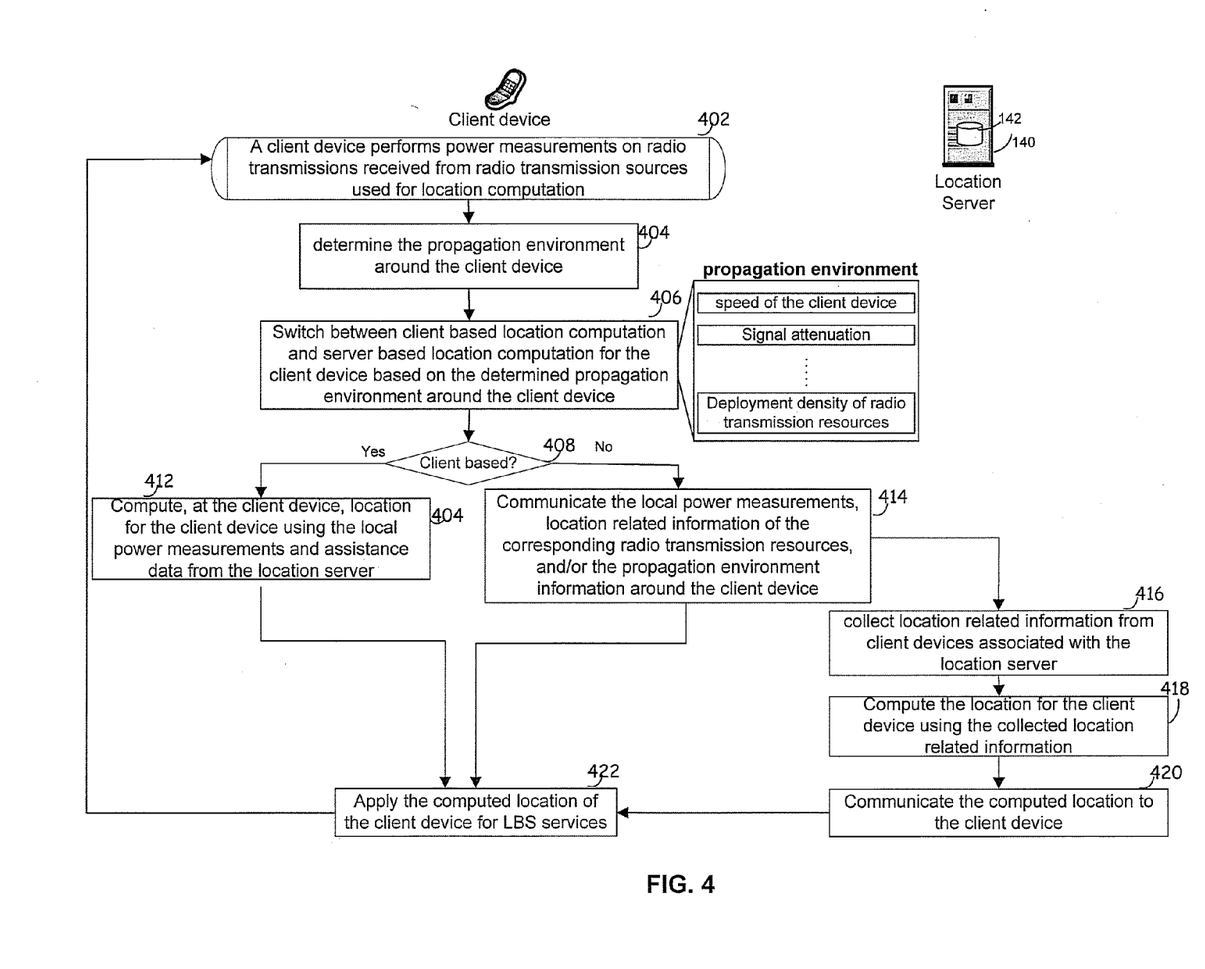
FIG. 4 is a flow chart illustrating an exemplary procedure that is utilized by a hybrid location client device to intelligently switch between client based location computation and server based location computation, in accordance with an embodiment of the invention.

FIG. 4 is a flow chart illustrating an exemplary procedure that is utilized by a hybrid location client device to intelligently switch between client based location computation and server based location computation, in accordance with an embodiment of the invention. Referring to FIG. 4, the exemplary steps may start with step 402. In step 402, a client device such as the hybrid location client device 101a may be operable to perform power measurements on radio transmissions received from various radio transmission sources that may used for location computation. In step 404, the hybrid location client device 101a may monitor or determine the propagation environment around the hybrid location client device 101a. The surrounding propagation environment may comprise propagation information such as the moving speed of the hybrid location client device 101a, signal attenuation, deployment distribution of the radio transmission resources, geographic area type such as indoor area and outdoor area, physical obstacles around the hybrid location client device 101a, and/or relative or actual distance between the hybrid location client device 101a and surrounding physical obstacles. In step 406, the hybrid location client device 101a may switch or select between client based location computation and server based location computation based on the propagation environment around the hybrid location client device 101a.

In step 408, it may be determined if client based location computation is selected. In instances where client based location computation is selected for the hybrid location client device 101a, then in step 412, the hybrid location client device 101a may be operable to compute its own location utilizing the local power measurement and assistance data downloaded from the location server 140. The downloaded assistance data from the location server 140 may comprise location information for the radio transmission sources that may used for location computation. The exemplary process continues in step 422, where the hybrid location client device 101a may apply the computed location for location-based services. The exemplary process returns in step 402 when needed.

In step 408, in instances where client based location computation is not selected for the hybrid location client device 101a, then in step 414, the hybrid location client device 101a may communicate the local power measurements, location related information of the corresponding radio transmission resources, and/or information about the propagation environment around the hybrid location client device 101a to the location server 140 via the communication networks 130. In step 416, the location server 140 may be operable to collect location related information such as local power measurements and the propagation environment from a plurality of client devices associated with the location server 140. In step 418, the location server 140 may be operable to compute the location for the hybrid location client device 101a utilizing the collected location related information. In step 420, the location server 140 may be operable to communicate the computed location to the hybrid location client device 101a via the communication networks 130. The hybrid location client device 101a may determine the corresponding server based location solution from information received from the location server 140. The exemplary process continues in step 422.

In various exemplary aspects of the method and system for intelligent switch between client based location computation and server based location computation for hybrid location client devices, a wireless communication device such as the hybrid location client device 200 may be operable to monitor or determine the propagation environment around the hybrid location client device 200 through a map, for example. The hybrid location client device 200 may be operable to dynamically select one of client based location computation and server based location computation based on the propagation environment around the hybrid location client device 200. The location for the hybrid location client device 200 may be determined utilizing the selected one of client based location computation and server based location computation. In an exemplary embodiment of the invention, the hybrid location client device 200 may switch between client based location computation and server based location computation based on the local propagation environment in order to maintain or ensure a desired quality of location while reducing data load from the location server 140. The hybrid location client device 200 may determine power of radio transmissions received from various radio transmission sources such as the wireless access points 112a-112g and the base stations 114a-114c that may used for location computation. Depending on device capabilities and user preferences, the hybrid location client device 200 may utilize hybrid radios such as, for example, the WLAN receiver 202, the cellular transceiver 204 and/or the WiMAX transceiver 206, to receive the corresponding radio transmissions. For a client based location solution, the hybrid location client device 200 may be operable to download assistance data from the location server 140. The downloaded assistance data may comprise location information for the radio transmission resources utilized for location computation. The location for the hybrid location client device 200 may be computed at the hybrid location client device 200 utilizing the local power measurement and the downloaded assistance data. For a server based location solution, the location server 140 may perform location computation for the hybrid location client device 200. In this regard, the hybrid location client device 200 may communicate the local power measurement, location related information for the corresponding radio transmission resources, and/or information about the local propagation environment information to the location server 140. The location server 140 may be operable to collect or retrieve location related information from the hybrid location client device 200 as well as from a plurality of other devices such as the wireless access points 112a-112g, the base stations 114a-114c, and the hybrid location client devices 112a-112c. The location server 140 may store the collected location related information in the reference database 304. The location server 140 may utilize stored information such as power measurement and/or propagation environment information in the reference database 304 to compute the location for the hybrid location client device 200. The location server 140 may provide the resulting server based location solution to the hybrid location client device 200 via the communication networks 130. The hybrid location Client device 200 may determine the server based location solution by decoding information received from the location server 140.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for intelligent switch between client based location computation and server based location computation for hybrid location client devices.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method in a wireless communication device, comprising:
    selecting one of a first or a second location computation, computed by the wireless communication device or a server, respectively, based on propagation environment information around the wireless communication device;
    determining a location of the wireless communication device utilizing the selected location computation; and
    repeating the selecting of one of the first or the second location computation in response to changes in the propagation environment information.

2. The method according to claim 1, further comprising:
    measuring power of radio transmissions received by the wireless communication device, and further comprising:
    computing the first location computation utilizing the power measurements.

3. The method according to claim 2, wherein the radio transmissions comprise at least one of:
    Wireless Local Area Network (WLAN) radio transmissions;
    Bluetooth radio transmissions;
    cellular radio transmissions; or
    Worldwide Interoperability for Microwave Access (WiMAX) radio transmissions.

4. The method according to claim 2, further comprising:
    downloading assistance data from the server,
    wherein the assistance data comprises a location of the radio transmissions.

5. The method according to claim 4, further comprising:
    computing the first location computation utilizing the assistance data.

6. The method according to claim 2, further comprising:
    communicating the power measurements and the propagation environment information to the server.

7. The method according to claim 6, further comprising:
    computing the second location computation utilizing at least one of:
    the power measurements;
    the propagation environment information; or
    information collected from a plurality of client devices associated with the server.

8. The method according to claim 7, further comprising:
    receiving the second location computation from the server via a communication network.

9. A system for communication, the system comprising:
    one or more processors and/or circuits in a wireless communication device configured to:
    measure propagation environment information around the wireless communication device;
    select one of a first or a second location computation, performed by the wireless communication device or a server, respectively, based on the propagation environment information; and
    determine a location of the wireless communication device utilizing the selected location computation,
    wherein the one or more processors and/or circuits are further configured to repeat the selecting of one of the first or the second location computation in response to changes in the propagation environment information.

10. The system according to claim 9, wherein the one or more processors and/or circuits are further configured to measure power of radio transmissions received by the wireless communication device, and to utilize the power measurements to compute the first location computation.

11. The system according to claim 10, wherein the radio transmissions comprise at least one of:
    Wireless Local Area Network (WLAN) radio transmissions;
    Bluetooth radio transmissions;
    cellular radio transmissions; or
    Worldwide Interoperability for Microwave Access (WiMAX) radio transmissions.

12. The system according to claim 10, wherein the one or more processors and/or circuits are to further configured to receive assistance data from the server, and wherein the assistance data comprises a location of the radio transmissions.

13. The system according to claim 12, wherein the one or more processors and/or circuits are further configured to compute the first location computation utilizing the power measurements and the assistance data.

14. The system according to claim 10, wherein the one or more processors and/or circuits include a transmitter and are further configured to communicate the power measurements and the propagation environment information to the server via the transmitter.

15. The system according to claim 14, wherein the server is configured to compute the second location computation utilizing at least one of:
   the power measurements;
   the propagation environment information; or
   information collected from a plurality of other client devices associated with the remote server.

16. The system according to claim 15, wherein the one or more processors and/or circuits are further configured to receive the second location computation from the server via a communication network.

17. The method according to claim 1, further comprising:
   tracking the propagation environment information over time; and
   storing the propagation environment information in a location database.

18. The method according to claim 1, further comprising:
   decoding the second location computation to provide decoded computation information, and wherein the determining comprises:
   determining the location of the wireless communication device utilizing the decoded computation information.

19. The system according to claim 9, further comprising:
   a location database configured to store information,
   wherein the processor is further configured to track the propagation environment information over time and to store the propagation environment information in the location database.

20. The system according to claim 9, wherein the processor is further configured to decode the second location computation to provide decoded computation information and to determine the location of the wireless communication device utilizing the decoded computation information.

* * * * *